United States Patent Office 2,911,427
Patented Nov. 3, 1959

2,911,427

CHLOROSILOXANES

Paul L. Brown, Saginaw, Mich., assignor to Dow Corning Corporation, Midland, Mich., a corporation of Michigan No Drawing. Application December 11, 1957
Serial No. 701,988

2 Claims. (Cl. 260—448.2)

This invention relates to trifluoroalkylfluorosiloxanes. It is the object of the present invention to prepare low molecular weight fluorosiloxanes which are useful as water-repelling agents and as intermediates in the preparation of siloxane polymers. Other objects and advantages will be apparent from the following description.

The invention relates to chlorosiloxanes of the formula

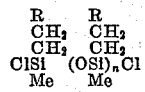

where R is a perfluoroalkyl radical of 1 to 3 inclusive carbon atoms and $n$ is an integer from 1 to 3 inclusive.

The compositions of this invention are best prepared by hydrolyzing a chlorosilane of the formula

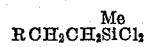

to produce the corresponding siloxane hydrolyzate and thereafter reacting this hydrolyzate with aqueous hydrochloric acid under superatmospheric pressures. The method is described in great detail in the copending application of James F. Hyde and Paul L. Brown, Serial No. 615,470, filed October 12, 1956, the disclosure of which is hereby incorporated in this application by reference.

In general, the reaction with the aqueous HCl is carried out at superatmospheric pressure ranging from 100 to 500 lbs. at a temperature of approximately 30° C. The reaction is carried out until equilibrium is established and the chlorosiloxanes so formed are then separated from the aqueous acid and distilled to isolate the individual species.

The products of this invention are particularly useful for treating glass fabrics in order to render them water repellent and to improve their lubricity. They are also useful as intermediates in the preparation of organopolysiloxanes.

The following examples are illustrative only and should not be construed as limiting the invention which is properly delineated in the appended claims.

*Example 1*

1 gallon of

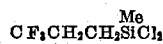

was added to 2500 ml. of water in a pressure vessel. The mixture was stirred for 2 hours, the vessel was sealed and anhydrous HCl was added in increments until the pressure reached 220 p.s.i. at 24° C. The total reaction time at superatmospheric pressure was 48 hours. The equilibrated product was then separated from the aqueous acid and was distilled. The first fraction boiling 62 to 88° C. at 1 mm. was redistilled to give the product

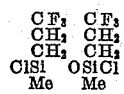

boiling at 72° C. at 1.5 mm. and having the following properties: viscosity at 25° C. 2.9 cs., $d$ at 25° C. 1.072, $n_D^{25}$ 1.3800. The distillation of the reaction product was continued and there was isolated a siloxane of the formula

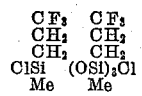

boiling at 122° C. at 1 mm. and having the following properties: viscosity at 25° C. 12.45 cs., $d$ at 25° C. 1.286, $n_D^{25}$ 1.3800.

*Example 2*

1 gallon of the cyclic siloxane

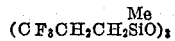

was added to 2 liters of concentrated hydrochloric acid in a pressure vessel. Anhydrous HCl was then added until the pressure reached 265 p.s.i. at 24° C. The reaction was continued for 28 hours. The product was then separated from the aqueous acid and distilled to give the compound

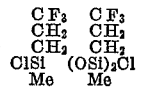

boiling at 96° C. at 1 mm. and having the following properties: viscosity at 25° C. of 6 cs., $d$ at 25° C. 1.2814, $n_D^{25}$ 1.3797.

*Example 3*

When a siloxane hydrolyzate of the unit formula

is reacted with hydrochloric acid in accordance with the procedure of Example 1 and the resulting product is separated from the aqueous acid and fractionated, the following siloxanes are obtained:

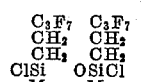

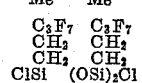

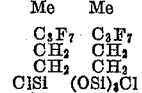

That which is claimed is:

1. A composition of matter of the formula

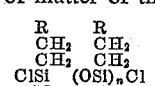

in which R is a perfluoroalkyl radical of from 1 to 3 inclusive carbon atoms and $n$ is an integer from 1 to 3 inclusive.

2. A composition of the formula

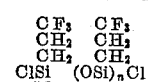

in which $n$ is an integer from 1 to 3 inclusive.

References Cited in the file of this patent

UNITED STATES PATENTS 2,381,366    Patnode _____ Aug. 7, 1945

OTHER REFERENCES

Tarrant: "Development of Fluoro-Silicone Elastomers, Wright Air Development Center Techn. Report 55-220 (August 1955), pp. 12 and 37.